May 12, 1964
G. E. DIETZ
3,133,234
MAGNETIC OPERATOR FOR VALVES OR THE LIKE
Filed June 10, 1960
2 Sheets-Sheet 1
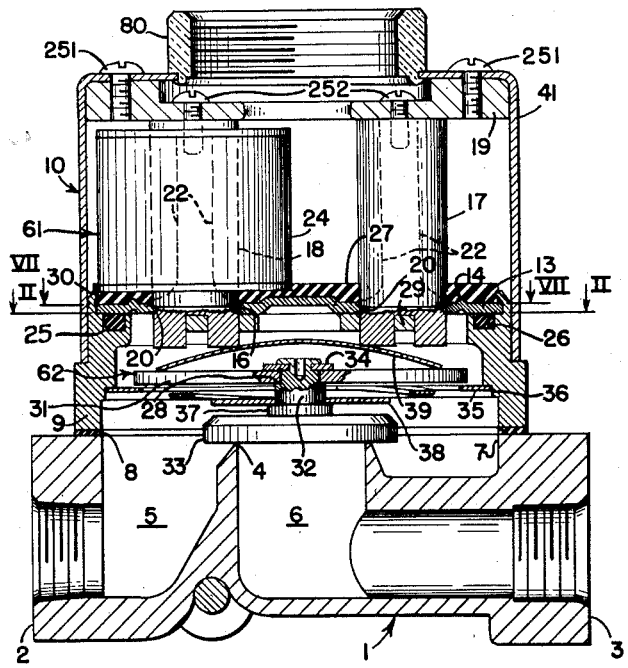
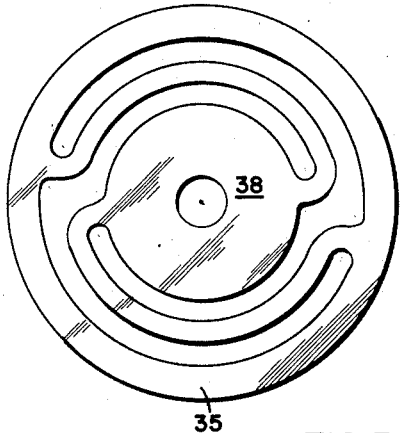
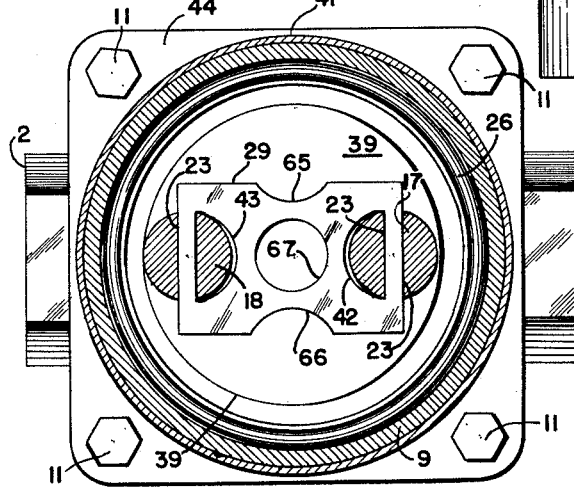
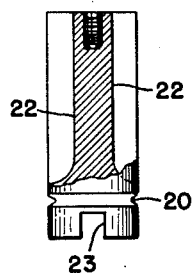
INVENTOR.
GERALD E. DIETZ
BY
Joseph C. Schwalbach
ATTORNEY May 12, 1964 G. E. DIETZ 3,133,234
MAGNETIC OPERATOR FOR VALVES OR THE LIKE
Filed June 10, 1960 2 Sheets-Sheet 2
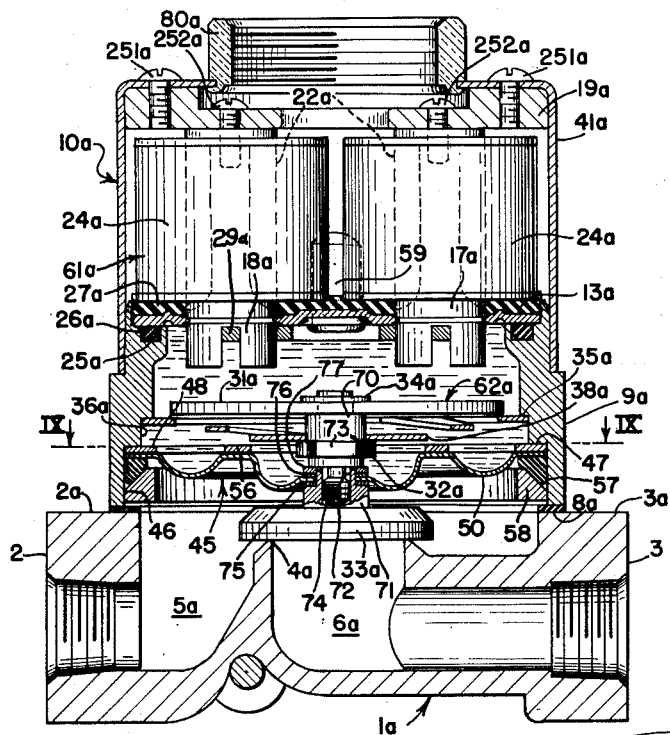
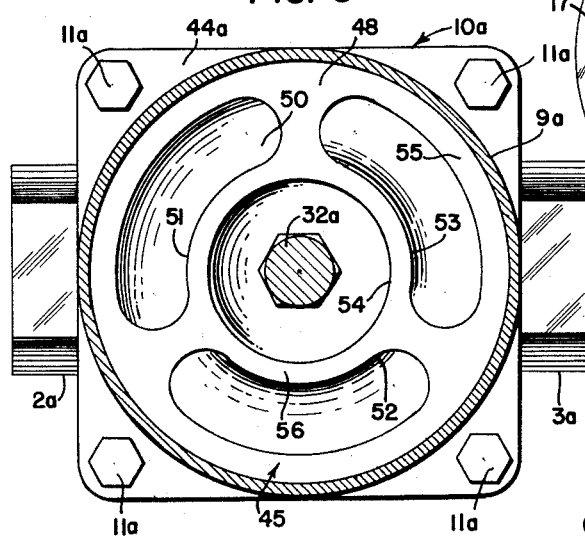
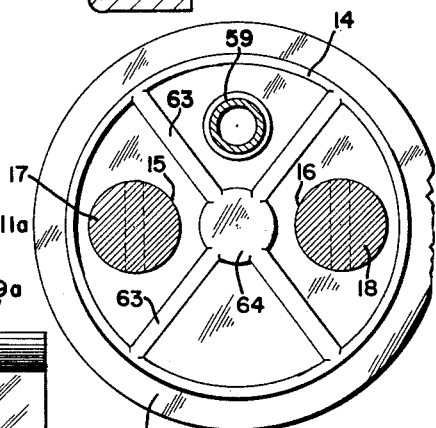
*INVENTOR.*
GERALD E. DIETZ
BY
Joseph C. Schwalbach
ATTORNEY

United States Patent Office 3,133,234
Patented May 12, 1964

3,133,234
MAGNETIC OPERATOR FOR VALVES
OR THE LIKE
Gerald E. Dietz, Milwaukee, Wis., assignor, by mesne assignments, to Penn Controls, Inc., Goshen, Ind., a corporation of Indiana
Filed June 10, 1960, Ser. No. 35,322
13 Claims. (Cl. 317—165)

This invention relates to improvements in operators for valves or the like and more particularly relates to operators of the type which employ a generally U-shaped electromagnet and a cooperable armature disc movable between attracted and retracted positions with respect to the pole faces of the electromagnet in response to energization and deenergization of the electromagnet.

Valve operators of the general type under consideration have been the subject of substantial development in recent years. Examples of valves utilizing this type of operator which have met with substantial commercial acceptance are the alternating current powered valves disclosed in Matthews et al. Patent No. 2,911,183, and in Dietz Patent No. 2,938,703, both of which are assigned to the assignee of the present invention. While the specific structures shown and described in the cross-referenced patents are designed for operation on alternating current, the same general type of operator finds substantial utility in the field of thermoelectrically powered devices.

It is a general object of the present invention to provide an improved operator for valves or the like, the novel features of which make possible the manufacture of a family of highly efficient valves of various capacities, said family of valves utilizing common and similar parts and being susceptible of fabrication by mass production fabricating techniques to thereby substantially reduce the manufacturing costs thereof.

Another object of the invention is to provide an improved operator of the aforementioned character having a novel electromagnet structure and novel means for mounting the same.

A further object of the invention is to provide an improved operator of the class described in which the electromagnet is constructed in a novel manner affording improved heat dissipation and cover mounting means therefor and also permitting the coils to be selectively removed from and replaced on the electromagnet frame or core without displacement of the core legs or the pole faces thereof.

Still another object of the invention is to provide an improved operator of the class described which is provided with novel shading means.

Another object of the invention is to provide an improved operator of the character aforementioned the fabrication of which includes a heat treating operation by which the electromagnet core legs are fused to a nonmagnetic supporting and sealing member and are simultaneously annealed to enhance their magnetic properties.

A further object of the invention is to provide an improved valve operator as aforesaid which, in one form thereof, is provided with novel means defining a liquid-filled armature chamber insuring silent operation.

Other and further objects and advantages of the invention will become apparent as the description proceeds, reference being had to the accompanying drawing in which:

FIGURE 1 is a vertical sectional view of a valve equipped with one form of the improved operator;

FIGURE 2 is a sectional plan view taken approximately along the line II—II of FIGURE 1;

FIGURE 3 is a plan view of the supporting and biasing member utilized in the improved operator;

FIGURE 4 is a view, partly in side elevation and partly in vertical section, of one of the core posts of the operator electromagnet;

FIGURE 5 is a plan view of the core post of FIGURE 4;

FIGURE 6 is an enlarged fragmentary vertical sectional view showing the connection of an electromagnet core post to the electromagnet supporting and sealing plate;

FIGURE 7 is a sectional plan view showing the electromagnet supporting and sealing plate and taken along the line VII—VII of FIGURE 1;

FIGURE 8 is a vertical sectional view similar to FIGURE 1 showing a valve provided with another form of the improved operator; and FIGURE 9 is a sectional plan view taken along the line IX—IX of FIGURE 8.

Referring now to FIGURES 1 to 7 of the drawings which illustrate one form of the improved operator, the numeral 1 indicates a lower valve body part provided with a fuel inlet connection 2 and a fuel outlet connection 3 and internal partition means defining an annular valve seat 4 interposed between an inlet chamber 5 and an outlet chamber 6. The flat upper surface of the valve body part 1 is formed with a circular opening 7 communicating with the inlet chamber 5, and affixed to the valve body part 1 in superimposed relation with a sealing gasket 8 and in registration with the opening 7 is a tubular valve body part or throat member 9. The member 9 is formed with a rectangular peripheral flange 44, as shown in FIGURE 2, and is fixed to the body part 1 as by screws 11 extending through suitable apertures in the flange 44 and into suitably threaded bores formed in the body part 1. The member 9 constitutes the mounting and support member for the improved operator indicated generally by the numeral 10, said operator comprising an electromagnet subassembly indicated generally by the numeral 61 and an armature and valve member subassembly indicated generally by the numeral 62.

In the form of the invention illustrated in FIGURES 1 to 7, the electromagnet assembly 61 comprises a nonmagnetic circular supporting and sealing plate 13, for example of non-magnetic stainless steel, formed with an annular offset portion 14 (FIGURE 7), crossed diametrical offsets 63, and a central offset 64 affording said plate rigidity. Plate 13 is also formed with a pair of spaced circular core leg receiving apertures 15 and 16. The frame or core of the electromagnet 61 comprises a pair of similar magnetically permeable cylindrical core legs 17 and 18 physically and magnetically connected by an annular magnetically permeable keeper member 19. As shown most clearly in FIGURES 4 and 6, the core legs are each formed adjacent one end with a circumferential groove 20, and following insertion of the core legs 17 and 18 into the apertures 15 and 16 respectively, the portions of the plate 13 at the margins of said apertures are deformed into the groves 20 as best shown in FIGURE 6, for example by ring staking, with the result that the core legs 17 and 18 are firmly held by plate 13. The core legs 17 and 18 are sealingly fused to the plate 13 by a furnace brazing operation, the heat of which simultaneously effects annealing of the core posts 17 and 18 to improve the magnetic permeability thereof. The offsets 14, 63 and 64 may be formed in the plate 13 after the annealing operation. The core posts 17 and 18 are formed with diametrically opposite longitudinally extending grooves 22 shown most clearly in FIGURES 4 and 5, which grooves are effective to reduce eddy current losses which typically occur in alternating current powered electromagnets. The core posts 17 and 18 are formed with coplanar opposite end faces, and the lower ends of said core posts are formed with parallel rectangular grooves 23 extending normal to the line connecting the axes of the core posts 17 and 18 and separating the lower end of each core post into a pair of semi-cylindrical pole pieces so that all of said pole pieces are in alinement along said axis connecting line.

An energizing winding 24 is removably disposed on the core post 18, and if desired a similar winding may be removably disposed on the core post 17. A circular sound insulating layer 27, for example of resilient foamed plastic, overlies the plate 13 and underlies the winding 24 as shown. The keeper member 19 is removably maintained in intimate engagement with the upper end surfaces of the core posts 17 and 18 by suitable magnetically permeable screws 252 extending through suitable apertures in a reduced thickness inner peripheral portion of said member and threaded into the upper ends of said core posts. The body part or throat member 9 is formed in its upper end with an annular groove 25 for receiving an O ring 26 of resilient rubber-like material. The upper end of the body part or throat member 9 is formed with an axially extending annular peripheral flange 30 which is rolled inwardly as shown to clamp the supporting and sealing plate 13 into sealing engagement with the O ring 26 as well as to rigidly clamp the electromagnet assembly 61 to the member 9.

Fixed to the underside of the plate 13, as by cementing, is a non-magnetic and electrically conductive shading plate 29 (FIGURES 1 and 2), for example of aluminum or copper, which may be generally rectangular in outline. The plate 29 is formed with a pair of generally semi-circular apertures 42 and 43 spaced inwardly from the opposite end edges thereof and receiving in said apertures the inner semi-cylindrical pole pieces of core posts 17 and 18 respectively as shown in FIGURE 2. The plate 29 may be formed with cut-outs 65 and 66 and aperture 67 for clearance purposes, said plate affording a separate shading ring or loop for each of the pole pieces accommodated in the apertures 42 and 43 thereof.

The armature and valve member assembly 62 comprises a circular magnetically permeable armature disc 31 which is centrally apertured to receive the reduced diameter upper end portion of the stem 32 of a valve member 33 cooperable with the annular valve seat 4. The stem 32 carries a washer 34 fixed to its upper end and retaining the armature 31 in abutment with a shoulder 28 formed thereon. The stem 32 extends through the central aperture of a circular guiding and biasing member 35 shown most clearly in FIGURE 3, said member being peripherally staked within a counterbore 36 formed in the body part 9. The valve stem 32 is formed with an enlarged diameter portion 37 which is engaged by the circular central portion 38 of the guiding and biasing member 35 which biases the valve member 33 into sealing engagement with the valve seat 4.

In order to reduce the noise ordinarily created by impactual engagement of the armature 31 with the pole faces of the core legs 17 and 18, as well as to absorb hum or chatter occasioned by the changing polarity of the A.C. current with which the electromagnet 61 is energizable, a resilient non-magnetic and electrically insulating film or disc 39 is interposed between the armature 31 and the core leg pole faces. The disc 39 may be formed of the polyester film sold under the trade name Mylar, and is preferably of from one to three mils in thickness, depending upon the magnetic characteristics desired.

It will be observed that clamping of the electromagnet assembly 61 into operative position on the member 9 sealingly closes the upper end of the body part 9. The electromagnet assembly 61 is enclosed within a heat conductive cylindrical cup-shaped cover 41 telescoped over the member 19 and upper end of body part 9 and fixed in operative position by screws 251 threaded into the member 19 as shown. The upper wall of the cover 41 is centrally apertured and has a conduit nut 80 staked therein as shown. Electrical leads (not shown) for the electromagnet 61 may extend through the central opening in the member 19 and through the conduit nut 80 to a source of electrical energy (also not shown). The member 19, because of the relatively large area of its thermal contact with the cover 41, affords improved heat transfer to said cover from which heat generated in the electromagnet is radiated to the environment. The structure described also permits removal and/or replacement of the cover, the member 19 and of the coil 24 without disturbing the rigid mounting of the pole pieces 17 and 18 and plate 13 aforedescribed.

In the operation of the valve shown in FIGURE 1, when the winding 24 of the electromagnet assembly 61 is deenergized, the parts are in the positions shown in FIGURE 1, i.e., the valve member 33 is biased to the closed position shown with respect to the valve seat 4, and the armature 31 is in the retracted position shown. Upon energization of the winding 24 with a predetermined magnitude of alternating current, the armature 31, and thereby the valve member 33, is lifted by magnetic attraction toward the lower end faces of the core post members 17 and 18 and against the bias of the guiding and biasing member 35 which guides said armature and valve member during such movement. The resilient film 39 absorbs the impact of the armature 31 against the pole faces and also absorbs hum or chatter occasioned by the change in polarity of the alternating current while the armature 31 is in attracted position. Further, the shading loops afforded by the plate 29 coact respectively with the inner pole piece of each of the core posts 18 and 17 to shift the phase of alternating current flux in said pole pieces in a manner well understood in the art. By having the pole pieces all in alinement as shown there is no tendency to impart a noise creating rocking motion to the armature 31 when attracted, as would be the case if the slots 23 were in alinement and therefore the pole pieces were not in alinement. The combination of the film 39 and the novel shading arrangement results in quietness of operation heretofore unattainable.

A modified form of operator is shown in the valve 10a of FIGURES 8 and 9. In FIGURES 8 and 9 the parts indicated by reference numerals with the suffix "a" correspond to similar parts shown in FIGURES 1 through 7 indicated by the same reference numerals without a suffix. The operator 10a is provided with a diaphragm assembly 45 which, with the supporting and sealing plate 13a forms within the throat member 9a a liquid-tight armature chamber. The lower end of the member 9a is formed with a counterbore 46 terminating in an internal annular shoulder 47, and peripherally clamped between said shoulder and a resilient O ring seal 57 backed up by a retaining ring 58 pressed into the counterbore 46 are a circular plate 48 and a thin flexible liquid impermeable diaphragm 50 of rubber-like resilient material. As shown most clearly in FIGURE 9, the plate 48 is formed with three arcuate apertures 51, 52 and 53, and with a central circular aperture 54 which define an outer peripheral ring 55 and an inner circular ring 56. The diaphragm 50 is preferably bonded to the ring portions 55 and 56 of the plate 48 and is centrally apertured and sealingly clamped at the margins of its central aperture to the valve stem 32a.

The aforementioned armature chamber is preferably filled with a liquid, for example silicone oil, and the plate 13a is provided with a fill tube 59 through which said chamber can be filled, said tube being sealed off following the filling operation. As shown in FIGURES 8 and 9, the diaphragm 50 assumes a depending semi-toroidal shape between the ring portions 55 and 56 and also protrudes downwardly from the ring portion 56 to its connection with the valve stem 32a as shown. The depending semi-toroidal portions of the diaphragm 50 afford temperature compensation preventing changes in temperature of the oil from having any substantial effect upon the positioning or the sealing force of the valve member 33a on the valve seat 4a. Expansion or contraction of the oil fill is reflected in distension or upward retractive movement of the semi-toroidal portions of the diaphragm 50. When the parts are in the deenergized closed valve position shown in FIGURE 8, the portion of the diaphragm 50 within the central ring portion 56 of plate 48 is not distended but rather is in a relatively relaxed condition as shown. This condition allows for accommodation of displaced liquid upon attractive movement of the armature 31a toward the pole faces of the core posts 17a and 18a upon energization of the electromagnet 61a. Because of the relaxed character of the central portion of the diaphragm 50 as aforedescribed, and because of the relatively small diaphragm area in said central portion as compared with that in the semi-toroidal portion, the expansion and contraction of the liquid fill has no substantial effect upon the sealing force or the movement of the valve member 33a.

Due to the fact that the armature 31a is disposed within a chamber entirely filled with a liquid, movement of the armature to attracted position with respect to the electromagnet pole faces and retention of said armature in attracted position is effected silently, even though the windings 24a of the electromagnet 61a are energized by alternating current. Not only is the movement of the armature 31a slowed by the dashpot effect produced by its movement through the liquid medium to thereby reduce impactual engagement of the armature with the pole faces, but hum and chatter while the armature is held in attracted position are also completely eliminated due to this dashpot effect in combination with the shading afforded by plate 29a.

In FIGURE 8 the armature and valve member subassembly 62a comprises a valve stem 32a having an upper portion 70 to which the armature 31a is fixed and having an internally threaded tubular lower portion 71 integral with the valve member 33a and terminating at its upper end in a reduced outer diameter portion 72. The stem portion 70 is formed with a polygonal nut-shoulder 73 engaged by the central portion 38a of the guiding and biasing member 35a and adapted for engagement by a tool. The stem portion 70 terminates at its lower end in a reduced diameter externally threaded portion 74 which is threaded into the tubular lower portion 71 as shown.

The upper end 74 of the lower stem portion 71 extends through the central aperture of the diaphragm which is clamped between a resilient gasket washer 75 therebelow and a metal clamping washer 76 thereabove. Overlaying the washer 76 and engaged by the upper stem portion 70 is a shim washer 77. The thickness of the shim washer 77 is selected to afford a predetermined dimension between the plane of the sealing face of the valve member 33a and the plane of the upper surface of the armature 31a when the parts are in assembled relation. The selection of a washer 77 of a thickness required to provide the aforementioned overall dimension during assembly of the parts insures attainment of said dimension in spite of variation in the dimensions of the component parts within predetermined tolerances which variations might tend to give a different overall dimension if a washer 77 of the same thickness were used in all assemblies. Tolerance build-ups are thus compensated for, and the valve member travel is thus controlled within close limits. The armature and valve member assembly 62a also permits removal and replacement of the valve member 33a after the operator 10a is completely assembled and the armature chamber is filled with oil.

Having thus described several embodiments of the improved operator, it is to be understood that the illustrated forms were selected to facilitate the disclosure of the invention, rather than to limit the number of forms which the invention may assume. Various modifications, adaptations and alterations may be applied to the specific forms shown to meet the requirements of practice, without in any manner departing from the spirit or scope of the invention, and all of such modifications, adaptations and alterations are contemplated as may come within the scope of the appended claims.

What is claimed as the invention is:

1. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, and means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly.

2. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, said core legs each being formed with a groove to receive portions of said disc at the margin of said apertures deformed thereinto, said core legs being sealingly fused to said disc to afford a rigid connection therebetween, peripheral portions of said disc coaxially overlaying said annular shoulder, annular sealing means interposed coaxially between portions of said shoulder and disc, and means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly.

3. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly, an energizing winding on at least one of said legs disposed closely adjacent said disc at the side thereof facing away from said pole faces, and a permeable member fixed to and magnetically connecting said legs at the end portion thereof opposite said pole faces.

4. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly, an energizing winding on at least one of said legs removably disposed closely adjacent said disc at the side thereof facing away from said pole faces, and a permeable member removably fixed to and magnetically connecting said legs at the end portion thereof opposite said pole faces.

5. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly, an armature mounted for movement axially of said throat toward and away from said pole faces, and a control member connected for movement with said armature.

6. An operator for valves or the like comprising an electromagnet comprising a pair of spaced parallel magnetically permeable core posts, a circular magnetically permeable member magnetically connecting said core posts, a cup-shaped non-magnetic heat conductive cover enclosing said electromagnet and in telescoping relation with said circular member, said cover having a transverse wall overlaying said circular member in metal-to-metal heat conductive contact, and means removably securing said cover to said circular member, said circular member affording conduction of heat generated in said electromagnet to said cover for radiation to the environment.

7. An operator for valves or the like comprising a body part having an annular throat portion terminating at one end in a coaxial annular shoulder formed with an outwardly facing coaxial annular groove, and an electromagnet assembly comprising a non-magnetic disc formed with a pair of apertures, a U-shaped magnet frame comprising a pair of parallel core legs sealingly fixed to said disc within said apertures respectively and terminating at one end in coplanar pole faces adjacent said disc, peripheral portions of said disc coaxially overlaying said annular groove, a resilient annular sealing ring disposed within said groove, and means rigidly clamping said disc to said shoulder and thereby said electromagnet assembly to said body part, said clamping engagement compressing said annular sealing ring to afford a fluid tight closure for said end of said throat portion as well as a support for said electromagnet assembly.

8. An operator for valves or the like comprising a body part having an annular throat portion formed with a coaxial annular shoulder, and an electromagnet assembly comprising a non-magnetic disc formed with a pair of apertures, a magnet comprising a pair of solid core legs, each formed with spaced longitudinal grooves and sealingly fixed to said disc within said apertures respectively, said core legs terminating at one end in coplanar pole faces adjacent said disc, peripheral portions of said disc coaxially overlaying said annular shoulder, annular sealing means interposed coaxially between portions of said shoulder and disc, and means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly.

9. In an operator for valves or the like, a U-shaped magnet core comprising a pair of core legs each terminating at one end in a pair of pole pieces having coplanar pole faces, all of said pole faces being in substantial alinement, shading means affording a pair of loops each surrounding the inner pole piece of one of said core legs respectively, and an armature movable to attracted and retracted positions with respect to said pole faces.

10. In an operator for valves or the like, a U-shaped magnet core comprising a pair of core legs each terminating at one end in coplanar pole faces each formed with a transverse slot normal to the alinement of said core legs providing each core leg with a pair of spaced pole pieces, a unitary apertured shading plate affording a pair of loop portions respectively surrounding the innermost of said pole pieces only, and an armature movable to attracted and retracted positions relative to said pole faces.

11. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly, an armature mounted for movement axially within said throat toward and away from said pole faces, a stem within said throat portion connected for movement with said armature, a diaphragm of fluid impermeable flexible sheet material peripherally sealingly connected to said throat portion and centrally sealingly connected to said stem to form a liquid tight armature chamber, and a quantity of liquid within said chamber.

12. An operator for valves or the like comprising a body part having an annular throat portion formed with a coaxial annular shoulder, and an electromagnet assembly comprising a non-magnetic disc formed with a pair of apertures, a magnet comprising a pair of core legs sealingly fixed to said disc within said apertures respectively and terminating at one end in coplanar pole faces adjacent said disc, peripheral portions of said disc coaxially overlaying said annular shoulder, annular sealing means interposed coaxially between portions of said shoulder and disc, means rigidly clamping said disc to said shoulder and thereby said electromagnet assembly to said body part, said clamping engagement compressing said annular sealing means between said disc and shoulder to afford a fluid tight closure for said throat portion as well as a support for said electromagnet assembly, an armature mounted for movement axially within said throat toward and away from said pole faces, a stem within said throat portion connected for movement with said armature, a diaphragm of fluid impermeable flexible sheet material peripherally sealingly connected to said throat portion and centrally sealingly connected to said stem to form a liquid tight armature chamber, an apertured circular transverse plate fixed within said throat portion and formed with a peripheral ring portion and a spaced concentric inner ring portion fixed to said diaphragm, said inner ring defining a central portion of said diaphragm therewithin movable with said stem, said diaphragm having temperature compensating semi-toroidal portions spanning the space between said peripheral and inner ring portions, and a quantity of liquid substantially filling said chamber.

13. In a valve operator or the like having an actuating member movable from one position to another, having means defining a cavity for accommodating said actuating member and an opening for said cavity, and having an actuated member connected for movement with said actuating member, the combination of a diaphragm of fluid impermeable resilient sheet material peripherally sealingly connected to the margin of said opening and centrally sealingly connected to said actuated member to sealingly close said cavity, an apertured circular plate fixed within said opening and formed with a peripheral ring portion and a concentric second ring portion spaced within said peripheral ring portion and fixed to said diaphragm, said plate defining a central portion of said diaphragm within said second ring portion which central portion is movable with said actuated member, and said diaphragm having temperature compensating semi-toroidal portions extending between said peripheral and second ring portions, and a quantity of liquid substantially filling said sealed cavity.

References Cited in the file of this patent
UNITED STATES PATENTS

| | | |
|---|---|---|
| 1,255,441 | Larson | Feb. 5, 1918 |
| 2,370,752 | Ray | Mar. 6, 1945 |
| 2,911,183 | Matthews et al. | Nov. 3, 1959 |
| 2,920,254 | Ray | Jan. 5, 1960 |
| 2,923,521 | Ray | Feb. 2, 1960 |
| 2,938,703 | Dietz | May 31, 1960 |